United States Patent [19]

Gilman

[11] Patent Number: 5,777,805
[45] Date of Patent: Jul. 7, 1998

[54] MAGNIFYING DEVICE

[76] Inventor: Gary Duane Gilman, P.O.Box 19990, Denver, Colo. 80219

[21] Appl. No.: 800,525

[22] Filed: Feb. 19, 1997

[51] Int. Cl.$^6$ .................................................. G02B 27/02
[52] U.S. Cl. ................................. 359/803; 359/808
[58] Field of Search ........................... 359/802, 803, 359/808, 810

[56] References Cited

U.S. PATENT DOCUMENTS

| 4,206,978 | 6/1980 | Leopoldi | 359/808 |
|---|---|---|---|
| 5,021,933 | 6/1991 | Cordes | 359/802 |
| 5,031,918 | 7/1991 | Brill | 359/802 |
| 5,132,849 | 7/1992 | Cordes | 359/810 |
| 5,331,472 | 7/1994 | Rassman | 359/894 |

*Primary Examiner*—Loha Ben
*Attorney, Agent, or Firm*—R. William Graham

[57] ABSTRACT

A magnifying device includes a translucent member having a first portion of a predetermined size and having first end of a predetermined convex shape and second end defining a circular cross-section surface portion, a generally cylindrical second portion of a predetermined size and having a diameter substantially equal in diameter to the second end of the first portion and having a first end generally defining a circular cross-section surface portion concentrically integrally formed adjacent with the second end of the first portion and having second end defining an annular cross-section surface portion, a third portion of a predetermined size having a first end generally defining a circular cross-section surface portion concentrically integrally formed adjacent with the second end of the second portion and having a second end of a predetermined smaller diameter than the first end of the third portion and defining a generally planar circular surface portion, wherein an angle is formed between about the second end of the first portion and the second end of the third portion such that when viewing from the convex end of the first portion through to the second end of the third portion a substantially magnified focused region is formed substantially at the second end of the third portion by virtue of the predetermined sizes.

11 Claims, 1 Drawing Sheet

MAGNIFYING DEVICE

BACKGROUND OF THE INVENTION

1. Field of the Invention

The present invention relates to the field of visual aids. More particularly, but not by way of limitation, the invention relates to a magnifying device particularly well suited for direct application onto a printed substrate for magnifying the print thereon without blurring the print.

2. Related Art

There exist in the field of visual aids a number of magnifying devices. Such devices commonly employ a disc shaped transparent member, such as glass, having a pair of convex sides and is referred to as a lens. The lens usually retained by a ring member which is connected to a handle. This type of magnifying device requires the user to continuously hold the device over the viewed printed substrate at a given focal point of the device. This is tiresome and difficult in some applications wherein the user may also have need to operate a transportation vehicle, such as a plane or auto. If placed on the map, such devices create a visual blurring of the text with the exception of a relatively small focal region.

Accordingly, there remains a need for improvement in the field of visual aids. The present invention solves the problems above.

BRIEF SUMMARY OF THE INVENTION

It is an object to improve visual aids.

It is another object to improve magnifying devices.

It is another object to ease the use of magnifying devices while increasing the effective focal region.

Accordingly, the present invention is directed to a magnifying device. The magnifying device includes a translucent member having a first portion of a predetermined size which includes a first end of a predetermined convex shape and second end defining a surface portion, a second portion of a predetermined size and having a diameter substantially equal in diameter to the second end of the first portion and having a first end generally defining a surface portion integrally formed adjacent with the second end of the first portion and having second end defining a surface portion, a third portion of a predetermined size having a first end generally defining a surface portion integrally formed adjacent with said second end of said second portion and having a second end of a predetermined smaller diameter than the first end of the third portion and defining a surface portion, wherein an angle is formed between about the second end of the first portion and the second end of the third portion such that when viewing from the convex end of the first portion through to the second end of the third portion a substantially magnified focused region is formed substantially at the second end of the third portion by virtue of the predetermined sizes and focal lengths between substantially any given point on the convex end and the second end of the third portion. Preferably, the surface portions are circular shaped and the angle is frustoconical. The magnifying device also preferably includes a magnetic portion connected to the device.

Other objects and advantages will be readily apparent to those skilled in the art upon viewing the drawings and reading the detailed description hereafter.

DETAILED DESCRIPTION OF THE INVENTION

Figure 1:
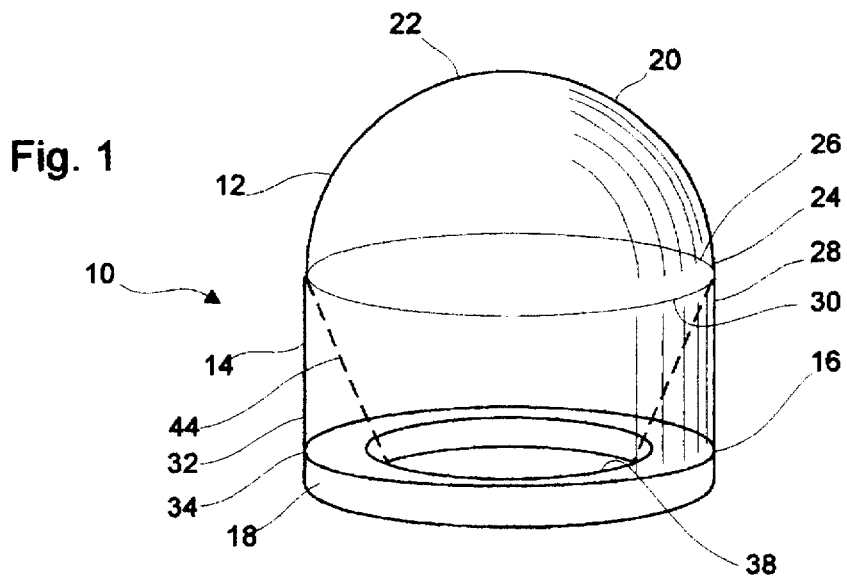
FIG. 1 is a perspective view of the present invention.
Figure 2:
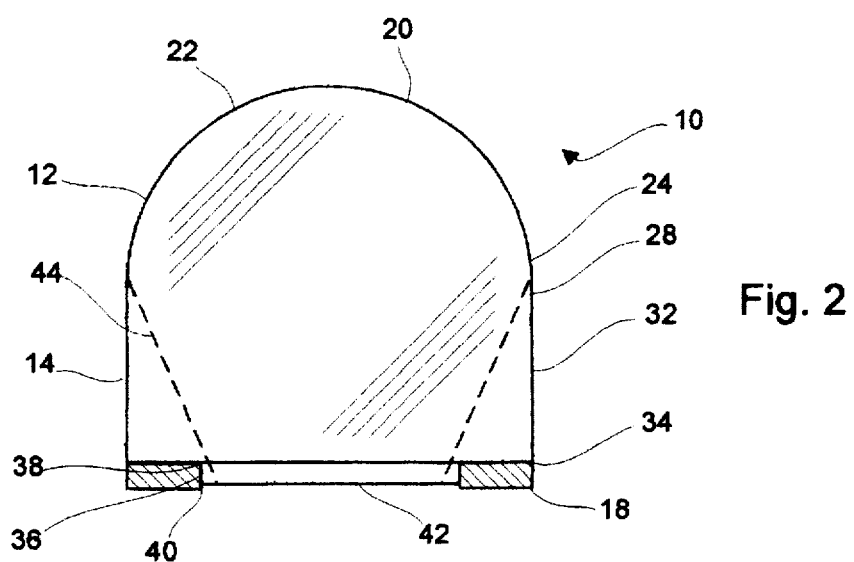
FIG. 2 is a side cross-sectional view of the present invention.
Figure 3:
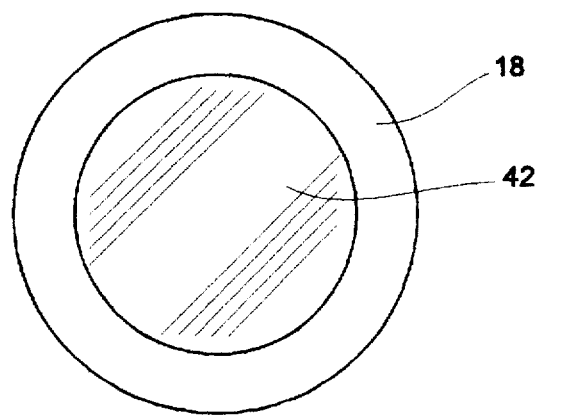
FIG. 3 is a bottom view of the present invention.

Referring now to the drawings, the present invention is directed to a magnifying device and is generally designated by the numeral 10. The magnifying device 10 includes a first portion 12, second portion 14 and third portion 16. The magnifying device 10 also includes a magnetic portion 18.

The first portion 12 is of a predetermined size and has a first end 20 of a predetermined convex shape and has an apex surface point 22 and second end 24 defining a circular cross-section surface portion 26. The convex shape is shown as generally hemispherical, but it is contemplated that other arcuate surfaces may be operational by varying dimensions of portions 14 and 16 of the present invention.

The second portion 14 is generally cylindrical and of a predetermined size, to permit a focusing objective set forth herein and in this embodiment has a diameter substantially equal to the diameter of the second end 24 of the first portion 12. The second portion 14 has a first end 28 generally defining a circular cross-section surface portion 30 concentrically integrally formed adjacent with the second end 24 of the first portion 12 and has a second end 32 defining a annular cross-section surface portion 34.

The third portion 16 is of a predetermined size and has a first end 36 generally defining a circular cross-section surface portion 38 and is concentrically integrally formed adjacent with the second end 32. The third portion 16 has a second end 40 of a predetermined smaller diameter than the first end 36 and defines a generally planar circular surface portion 42. A frustoconical angle 44 is formed between the ends 36 and 40 of the third portion 16 such that when viewing from the convex end 20 of the first portion 12 through to the second end 40 of the third portion 16 a substantially magnified focused region 41 is formed substantially at the second end 40 by virtue of the predetermined sizes, arcuate surface of convex end 20 and focal length existing between substantially any given point on the convex end 20 and any given point on the planar circular surface portion 42.

The frustoconical angle 44 formed between the portions 14 and 16 aids in preventing the viewer from seeing blurring of text caused by the reflective pattern of light which one would normally see if positioned at a normal distance, i.e., a foot or more away, viewing the printed surface through a hemispherical translucent magnifying device or conventional double sided convex lens. The tendency of the eye is to capture all that is viewable or magnified and the frustoconical angle 44 aids the present invention to filter out text which would normally appeared blurred to user when positioned and viewing the printed surface through the device.

In operation, the magnifying device 10 is disposed on a printed substrate to be viewed, e.g., a map, with the end 40 disposed adjacent to the map. By so providing, the present invention permits a clear and focused view within the entire region 41 of the planar circular portion 42 without any substantial blurring effect within the focused region and thus prevents eye strain on the user. Moreover, the user does not have to bother with focusing the magnifying device 10 because of the predetermined focused region 41 is stable once slidably positioned on the viewed surface.

The magnetic portion 18 is preferably of an annular configuration to conform about the third portion 16 between the ends 36 and 40. The magnetic portion 18 can be connected to the third portion 16 by an adhesive material which can be of any type to accomplish the fixation thereof preferably in a permanent fashion. The magnetic portion 18 also preferably is configured to permit direct printing thereon or the affixation of a printed material thereon for the purpose of providing an advertising mechanism. Another advantage gained by the magnetic portion is to aid in the ability to fix orientation of the magnifying device 10 onto a map or the like having a metallic backing.

The above described embodiment is set forth by way of example and is not for the purpose of limiting the present invention. It will be readily apparent to those skilled in the art that obvious modifications, derivations and variations can be made to the embodiment without departing from the scope of the invention. For example, the shape of the magnifying device may take on other suitable geometric configurations to accomplish the objectives stated herein. Accordingly, the claims appended hereto should be read in their full scope including any such modifications, derivations and variations.

What is claimed is:

1. A magnifying device, which includes:

a first translucent portion of a predetermined size which includes a first end of a predetermined arcuate shape and a second end defining a surface portion;

a translucent second portion of a predetermined size and having a diameter substantially equal in diameter to said second end of said first portion and having a first end defining a surface portion integrally formed adjacent with said second end of said first portion and having second end defining a surface portion; and a third translucent portion of a predetermined size having a first end generally defining a surface portion integrally formed adjacent with said second end of said second portion and having a second end of a predetermined smaller diameter than said second end of said second portion and defining a surface portion, wherein an angle is formed between about said second end of said first portion and said second end of said third portion such that when viewing from said arcuate end of said first portion through to said second end of said third portion a substantially magnified focused region is formed substantially at said second end of said third portion.

2. The magnifying device of claim 1, which further includes a magnetic portion connected to said device in a nonobstructing manner with respect to said focused region.

3. The magnifying device of claim 2, wherein said magnetic portion has a printed surface thereon which is readily viewable.

4. The magnifying device of claim 2, wherein said magnetic portion is disposed about said third portion between said ends of said third portion.

5. The magnifying device of claim 1, wherein a focal length exists between substantially any given point on said first end of said first translucent portion and any given point on said second end of said third translucent portion.

6. A magnifying device, which includes:

a first translucent portion of a predetermined size which includes a first end of a predetermined convex shape and a second end defining a circular cross-section surface portion;

a generally cylindrical translucent second portion of a predetermined size and having a diameter substantially equal in diameter to said second end of said first portion and having a first end generally defining a circular cross-section surface portion concentrically integrally formed adjacent with said second end of said first portion and having second end defining an annular cross-section surface portion; and a third translucent portion of a predetermined size having a first end generally defining a circular cross-section surface portion concentrically integrally formed adjacent with said second end of said second portion and having a second end of a predetermined smaller diameter than said second end of said second portion and defining a generally planar circular surface portion, wherein a frustoconical angle is formed between about said second end of said first portion and said second end of said third portion such that when viewing from said convex end of said first portion through to said second end of said third portion a substantially magnified focused region is formed substantially at said second end of said third portion by virtue of said predetermined sizes.

7. The magnifying device of claim 6, which further includes a magnetic portion connected to said device in a nonobstructing manner with respect to said focused region.

8. The magnifying device of claim 7, wherein said magnetic portion has a printed surface thereon which is readily viewable.

9. The magnifying device of claim 7, wherein said magnetic portion is disposed about said third portion between said ends of said third portion.

10. The magnifying device of claim 6, wherein said convex end is generally hemispherical.

11. The magnifying device of claim 6, wherein a focal length exists between substantially any given point on said convex end and any given point on said planar circular surface portion.

* * * * *